W. Mont Storm & G. H. Ennis
Felting Machine.

Nº 83743.  Patented Nov. 3, 1868.

Witnesses
E. W. Cory
William Ennis

Wm Mont Storm
Geo. H. Ennis
Inventors.

United States Patent Office.

WILLIAM MONT STORM, OF NEW YORK, N. Y., AND GEORGE H. ENNIS, OF HUDSON COUNTY, NEW JERSEY.

*Letters Patent No. 83,743, dated November 3, 1868.*

IMPROVEMENT IN MACHINE FOR FULLING AND FELTING HAT-BODIES.

The Schedule referred to in these Letters Patent and making part of the same

*To all whom it may concern:*

Be it known that we, WILLIAM MONT STORM, of the city, county, and State of New York, and GEORGE H. ENNIS, of the county of Hudson, and State of New Jersey, have invented a certain new and useful Machine for Fulling and Felting Hat-Bodies, and felt in other forms, of which the following specification, in connection with the accompanying drawings, embraces a full and clear description.

Figure 1:
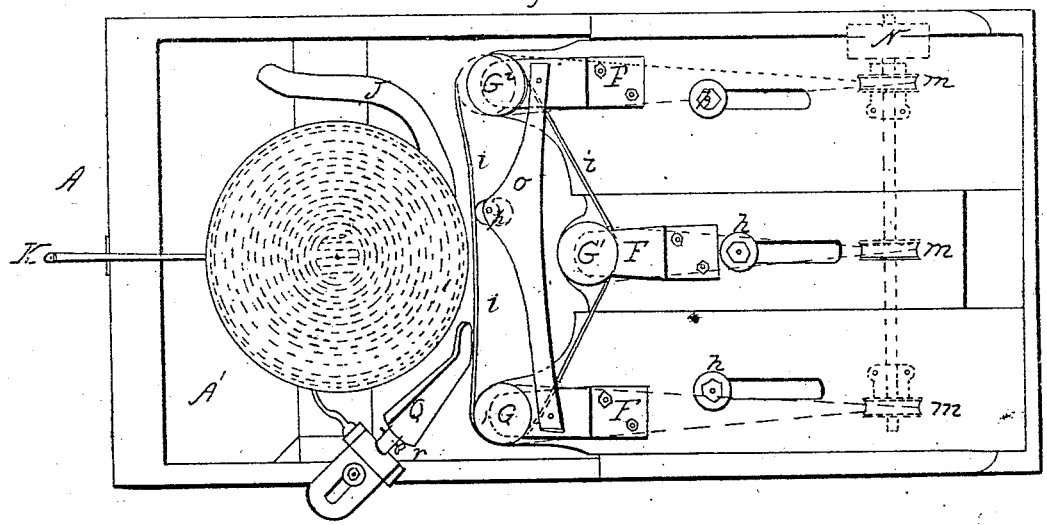
Figure 2:
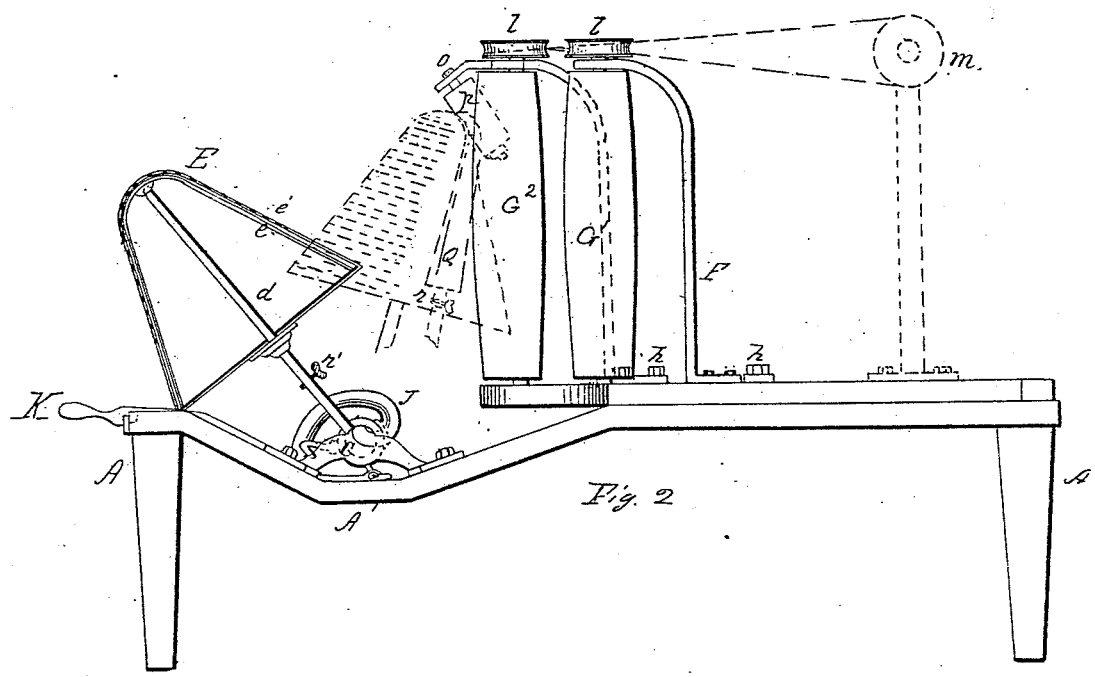

Figure 1 is a plan view of our machine.
Figure 2 is a vertical longitudinal section.
Like letters of reference refer to like parts in the respective figures.

A A is a kind of table, having a sink, A', as shown. In this sink, in proper bearings, turns a sort of cock, c, from which extends a hollow shaft or standard, d. The plug of this cock is fixed, and the barrel movable. On d is supported a "form," E, made, say, of sheet-metal, having two shells e e', as shown, the outer one having many small perforations. On this "form" is placed the hat-body to be fulled.

F F F are standards, supporting each a vertical roll, G G¹ G². These standards are so supported on the table as to be capable of being moved back or forward, to be adjusted in position, and then be "set" or held by means of stand-bolts and nuts h h h.

These rollers, the length of which should considerably exceed that of the form E, carry a species of endless apron or broad band, i i, which is preferably of netting, of rather close mesh, (like some fish-netting,) or of vulcanized sheet-rubber, or both.

J is a flexible tube, conveying hot water to the stationary cock c, when the machine is in operation, and the form in the position shown by the red lines, fig. 2; and thence the water passes through the hollow shaft or standard d, and between the shells of the "form," whence it oozes out through the perforations mentioned, and into the hat-body on the "form," thus keeping the hat-body saturated, when the form is in the vertical position shown in fig. 1, or in the inclined position shown in red, fig. 2.

To facilitate the putting on or removing of the hat-body, the passages through the cock c are so arranged that the flow of water up through the form E, when the latter is in the position shown in black, fig. 2, is shut off.

It should have been stated that the form is free to revolve on its standard d, and also that one or more of the rolls G are eccentrically mounted. (See G², fig. 2.) The purpose of this will presently be explained.

To the lower portion of the standard d is jointed (on the opposite side of the fulcrum to that of the "form") a rod, K, which, when the machine is in motion, and the form, with its hat-body, is in the position shown in red, fig. 2, latches on to a proper catch at the sink-end of the table, thus holding the form in the position named.

There is also, near the opposite end of the table, a cross-shaft, with pulleys, (shown in red,) which moves with the supports of the standards F, when the latter, with their rolls, are moved forward or back, to press the endless apron i i with the necessary force or tension against the felt-hat body on the "form," and cause a considerable portion of the circumference of the latter to be brought in contact with the apron.

On the top of each roller are pulleys l l, as shown, fig. 2, from which run small round belts to the corresponding pulleys, m m m, on the cross-shaft, which has at its end a belt-pulley, N, by which the whole machine is driven, the motion of N transmitting motion to the rollers G G¹ G², these, in turn, carrying around the apron, which, in turn, carries around the "form" E, thus bringing every portion of the saturated hat-body, with pressure, in contact with the apron, while, owing to the eccentricity of one or more of the rolls, as G², simultaneously with the elastic apron of India rubber or netting being carried around it, is also rapidly and repeatedly stretched and relaxed, laterally, and, in the act of stretching, draws narrower, vertically, producing a greater pressure upon the hat-body, and a gathering sort of action upon it, thus interlocking its fibres more closely, and compacting it generally.

This action will be readily understood. Inasmuch as it is necessary that the apron shall lap over to the centre of the top of the "form," so that every portion of the hat-body will be consecutively subjected to its action, there is a cross-piece, o, carrying a little inclined roller, p, which presses down the upper portion of the apron into the desired contact with the top of the hat-body. (See fig. 2.)

It would probably be desirable to use two rolls like p, one on each side of the top of the "form."

With hat-bodies of coarse material, the netting is supposed to be used alone, or in conjunction with the sheet-rubber apron, as giving a firmer and harder grip and gathering-action in the closing of its meshes vertically, at each instant of its being stretched laterally by the action of the eccentric roll, G².

For the finer qualities of felt, on the other hand, the India-rubber apron alone will suffice, of such thickness as experience may dictate.

It will be obvious that the rolls G G¹ G² can be mounted on horizontal axles, and, in lieu of the conical-shaped "form" for hat-bodies, a cylinder, with a corresponding horizontal axis, and mounted over a proper sink or trough, could be employed, and the machine be thus adapted to fulling felt in sheets.

In certain cases, in lieu of keeping the hat-body, while being fulled, saturated with hot water from within, as would be the case when the water was oozing through the perforations of the outer shell e' of the "form," it would be desirable to saturate the hat-body from the exterior, to which end we provide a hollow sprinkler, Q, perforated on the side next to the "form," and having connected to it, from c, a proper tube, to supply it with water, with a cock, r, to turn it on or off. The hollow standard d of the "form" has also a cock, r', for the same purpose. Thus the water can be supplied from within or without, or both, simultaneously.

The "form" is made to slip on or off its standard, so that different sizes may be used, according to the size of the hat-bodies to be treated. The sink A', intended to receive the waste water, has of course a proper drain-pipe, which may lead it back, to be again forced into the heater, whence it came; to be reheated.

If the steam, rising from the hat-body and sink, is objectionable, the machine may be set under a flue or cover, like that over a forge, for example, to carry it off.

As we deem the gathering-action of our apron (by its being alternately stretched and relaxed, as explained,) its most important function, we have naturally anticipated that, in lieu of netting or rubber for its material, we might employ certain kinds of cloths, but consider that the first-named materials would be best generally.

We have also anticipated that an apron, capable of the functions set forth, could be made by means of netting, whose meshes or interstices should be filled with elastic rubber.

We have also anticipated that the apron might tend to "rope" or fold up around the rolls, in which case we propose to obviate the difficulty by attaching to the upper and lower edges of the apron, respectively, an elastic cord, of sufficient size, which shall run on a correspondingly-grooved collar, located at each upper and lower ends of each of the rolls, (quite above and below the form E.) Said collars not to project beyond the surface of the bodies of the rolls, and being supported each on a spiral spring around the axle of the roll, and capable of an up-and-down motion in line with the axles, but not of a rotary motion independent of the rolls.

The relation of height to diameter of hat-bodies in general use, is such that we have anticipated that we could make a single "form" answer for the different sizes, by making the exterior of the form slightly concave, in lieu of straight, (up and down,) in outline, as shown in the drawings.

Having now fully explained the nature of our invention,

What we claim, and desire to secure by Letters Patent, is—

1. The apron or aprons of netting or sheet-rubber, one or both, so arranged that, while moving in contact with the body to be fulled, they shall be alternately stretched and relaxed, by means substantially as described, and for the purpose specified.

2. The hollow double-shelled form E, its outer shell perforated, and its inner shell whole, mounted and operating substantially in the manner and for the purpose described.

3. In combination with the above, the water-cock c and conduit-standard d, arranged and operating substantially in the manner and for the purpose described.

4. In combination with the perforated form E, the external sprinkler Q, arranged and operating substantially in the manner and for the purpose described.

5. The rolls G $G^1$ $G^2$, mounted upon movable standards, so that they shall be adjustable in position relative to the form E, substantially as and for the purpose set forth.

6. In combination with the above, the supplemental roll or rolls p, located and operating substantially in the manner and for the purpose described.

7. The latching-bar K, in combination with the swinging standard d, for the purpose set forth.

WM. MONT STORM.
GEO. H. ENNIS.

Witnesses:
E. W. CORY,
WILLIAM ENNIS.